No. 752,083. Patented February 16, 1904.

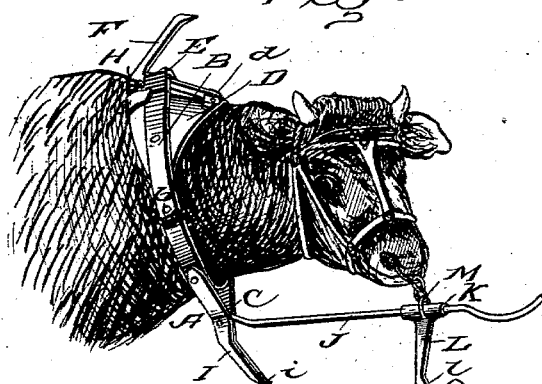
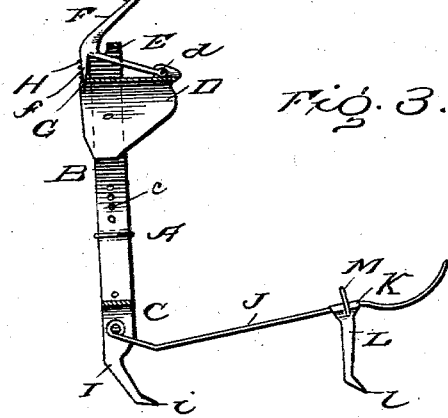
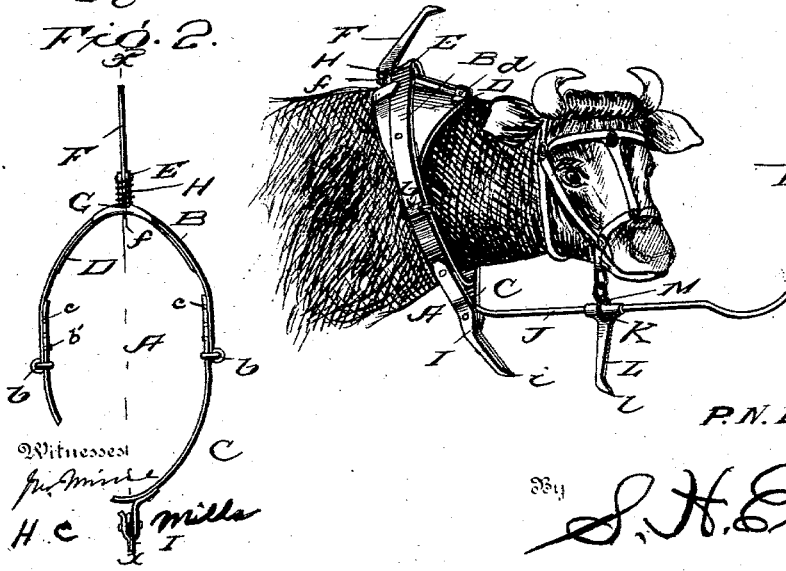

UNITED STATES PATENT OFFICE.

PHILLIP N. LEAR, OF WHITECLOUD, KANSAS.

YOKE.

SPECIFICATION forming part of Letters Patent No. 752,083, dated February 16, 1904.

Application filed April 21, 1903. Serial No. 153,604. (No model.)

*To all whom it may concern:*

Be it known that I, PHILLIP N. LEAR, a citizen of the United States, residing at Whitecloud, in the county of Doniphan and State of Kansas, have invented certain new and useful Improvements in Yokes, of which the following is a specification.

My invention relates to improvements in yokes, and more particularly to that class known as "pokes."

The object of my invention is to provide a poke of this character which will prevent cattle from jumping fences, and also for preventing animals from crawling through or under the ordinary strand-wire fence now in use.

Another object of my invention is to provide a device of this character which will also break the animal from attempting to jump or crawl through or under a fence without injuring the animal.

A further object of my invention is to provide a more simple, cheap, and effective device, and also to provide a device which will not interfere in the least with the animal in grazing.

In the accompanying drawings, Figure 1 is a perspective view of my device attached to the animal. Fig. 2 is an end view. Fig. 3 is a vertical sectional view taken on the line $xx$, Fig. 2. Fig. 4 is a perspective view showing it when attached to a halter. Fig. 5 is a side elevation of my improved yoke.

Referring now to the drawings, A represents a yoke which is made of an upper section B and a lower section C. The upper section B has at its lower end a loop $b$, which is adapted to receive the upper ends of section C, and said upper ends of said section are provided with transverse openings $c$, which are adapted to receive the pins $b'$, carried by the upper section. It will be seen by this construction that the yoke is adjustable and can be made to fit animals of different sizes. The upper end of the upper section B has secured to its under side a forwardly-extending enlarged plate D, which is adapted to rest upon the upper portion of the animal's neck, and thus making it less liable to make it sore. The extreme upper end of the section B above the plate D is formed into a vertical loop E, in which slides the L-shaped bar F. The forward end of said bar F is pivoted to the plate D at $d$, and the upper or vertical portion of said bar is provided with a hook $F'$, which is adapted to engage the wire of the fence and prevent the animal from crawling through or under the same. The said bar F is provided with a downwardly-extending pointed member $f$, which extends through an opening G in the plate D, and thus it will be seen that any rearward pressure on the vertical portion of the bar F will force said pointed member into the neck of the animal, and thus it will withdraw its head from between the wires of the fence. To normally hold the said pointed member up above the lower surface of the plate D, I provide a coil-spring H, surrounding the same, one end of which bears against the upper portion of the plate D and the opposite end against the bar F. The upward movement of said bar is limited by the upper end of the loop E.

Secured to the lower end of the section C of the yoke is a downwardly-extending member I, which is preferably made of two plates spaced apart at their upper ends and riveted together at their lower ends, forming a solid bar, and which is provided with a forwardly-extending hook $i$. Thus I provide a bar which will engage the fence when the animal attempts to jump the same. Pivoted between the said plates forming the bar I is a forwardly-extending bar J, which has its outer end curved, the purpose of which will be hereinafter more fully described. Instead of having the said bar J pivoted to the bar I it might have a swivel connection therewith which would give the animal better freedom in grazing. Sliding on said bar J is a sleeve K, which has rigidly connected to its lower side a downwardly-extending bar L, which is provided at its lower end with a hook $l$. The said sleeve K is provided with a ring M, which is adapted to be attached to the nose-ring of the animal, and thus it will be seen that the outer curved end of the bar J extends beyond the head of the animal and is at all times held there. It will also be noted that when the animal attempts to jump the same will engage the fence and will pull on the nose-ring.

When the animal has no nose-ring, an ordinary halter may be used, and the ring M may be secured thereto and act in the same way as when secured to the nose-ring.

The purpose of having the outer end of the bar J curved is to prevent it from catching in the ground and allowing it to slide thereon when the animal is grazing.

Having thus described my invention, what I claim, and desire to secure by Letters Patent, is—

1. A device of the character described comprising a yoke, an elongated bar pivoted to said yoke and extending forwardly, an adjustable sleeve carried by said bar and means carried by said sleeve for securing it to the head of the animal, substantially as described.

2. A device of the character described comprising a yoke, an elongated bar pivoted to the lower end of said yoke, an adjustable sleeve carried by the said bar intermediate its ends and means carried by the said sleeve for securing it to the nose of the animal, substantially as described.

3. A device of the character described, comprising a yoke, an elongated bar having one end pivoted to the lower end of the yoke, the opposite end of said bar being first curved slightly downwardly and then upwardly and means carried by said bar for securing it to the head of the animal, substantially as described.

4. A device of the character described comprising a yoke, an elongated bar pivoted to the lower end of said yoke, a sleeve loosely carried by said bar intermediate its end, a downwardly-extending member rigidly carried by said sleeve and means carried by said sleeve for securing it to the nose of the animal, substantially as described.

5. A device of the character described, comprising a yoke, an L-shaped pivoted lever carried by the upper end of said yoke, a pointed member carried by the lever and extending through the yoke, a coil-spring surrounding the pointed member above the yoke, a stop limiting the upward movement of said lever, an elongated bar pivoted at the lower end of said yoke, a sleeve loosely carried by said bar, a downwardly-extending rigid member carried by said sleeve and means carried by the upper portion of said sleeve for securing it to the head of the animal, substantially as described.

In testimony whereof I affix my signature in presence of two witnesses.

PHILLIP N. LEAR.

Witnesses:
C. H. WAKEFIELD,
J. W. HARPSTER.